United States Patent [19]

Crook, Jr. et al.

[11] Patent Number: 4,464,812
[45] Date of Patent: Aug. 14, 1984

[54] SOCKET FOR STRUCTURAL STRAND

[75] Inventors: Edward J. Crook, Jr., Tulsa; Gary R. Baxter, Owasso, both of Okla.

[73] Assignee: The Crosby Group, Inc., Tulsa, Okla.

[21] Appl. No.: 544,848

[22] Filed: Oct. 24, 1983

[51] Int. Cl.³ .............................................. F16G 11/04
[52] U.S. Cl. .................. 24/122.6; 403/275; 29/461
[58] Field of Search .......... 403/275, 277, 280; 24/122.6, 136 L, 115 M; 188/67; 29/461

[56] References Cited

U.S. PATENT DOCUMENTS

| 2,032,567 | 3/1936 | Fiege | 24/122.6 X |
| 2,341,922 | 2/1944 | King et al. | 403/275 X |
| 3,600,765 | 8/1971 | Rovinsky et al. | 403/275 X |
| 3,676,899 | 7/1972 | Ehlert | 403/275 X |
| 3,723,636 | 3/1973 | Eucker | 24/122.6 X |
| 3,829,937 | 8/1974 | Metzler | 24/122.6 |

FOREIGN PATENT DOCUMENTS

| 248185 | 3/1926 | United Kingdom | 24/122.6 |
| 825651 | 12/1959 | United Kingdom | 24/122.6 |

Primary Examiner—Andrew V. Kundrat
Attorney, Agent, or Firm—Head, Johnson & Stevenson

[57] ABSTRACT

A mechanically connected socket for 'on-the-job' connection with structural strand includes a sleeve and an internal wedge shaped member through which the center core of the strand is received and retained while one or more outer layers extend longitudinally about the wedge and a bulbous head which, when assembled, encapsulates the strand.

5 Claims, 15 Drawing Figures

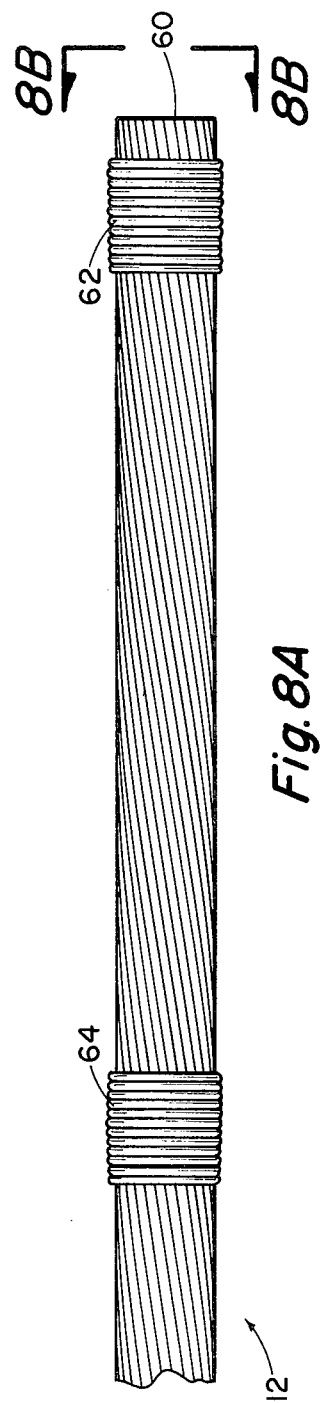
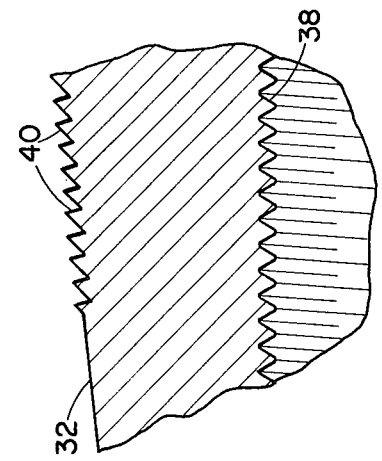
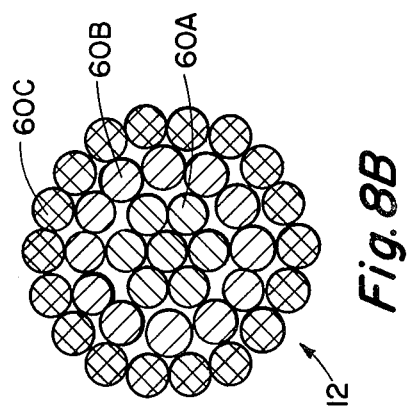

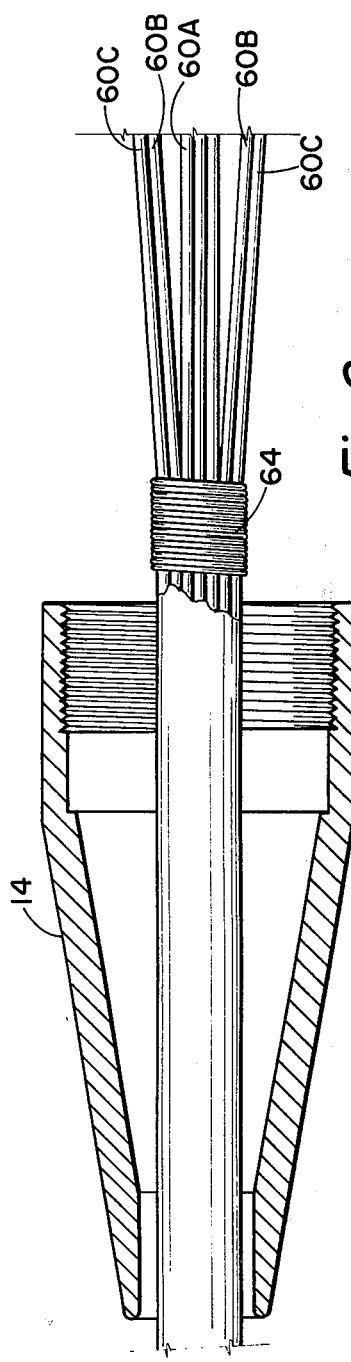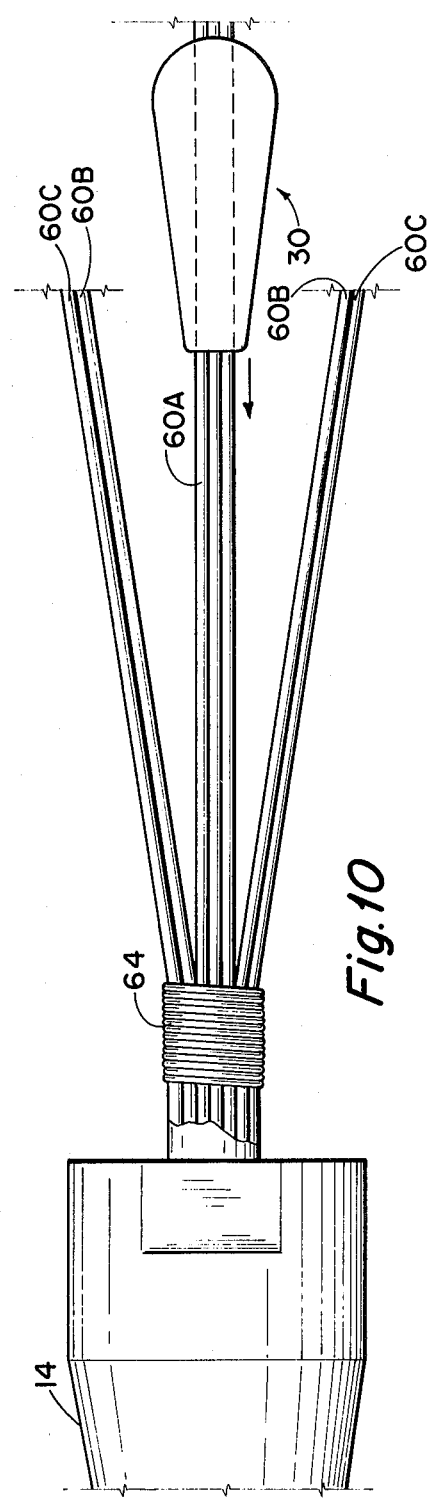

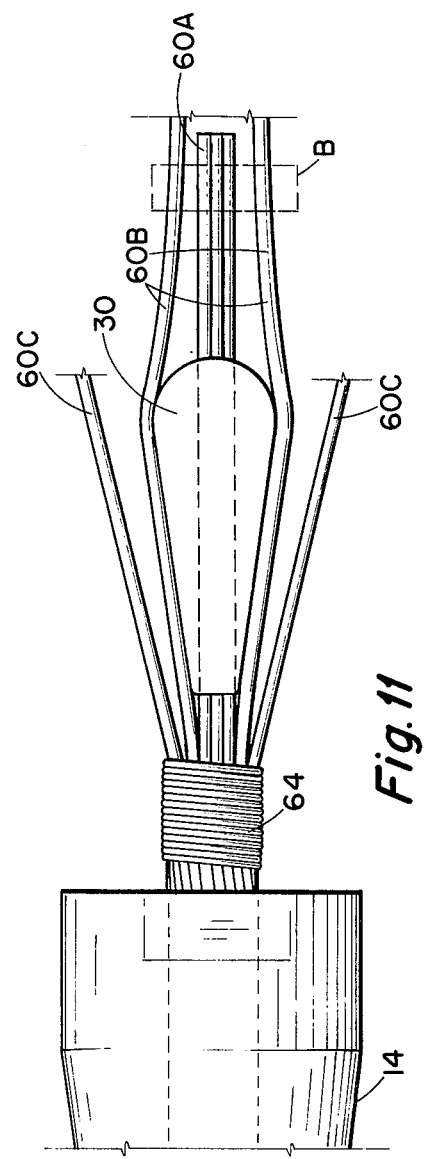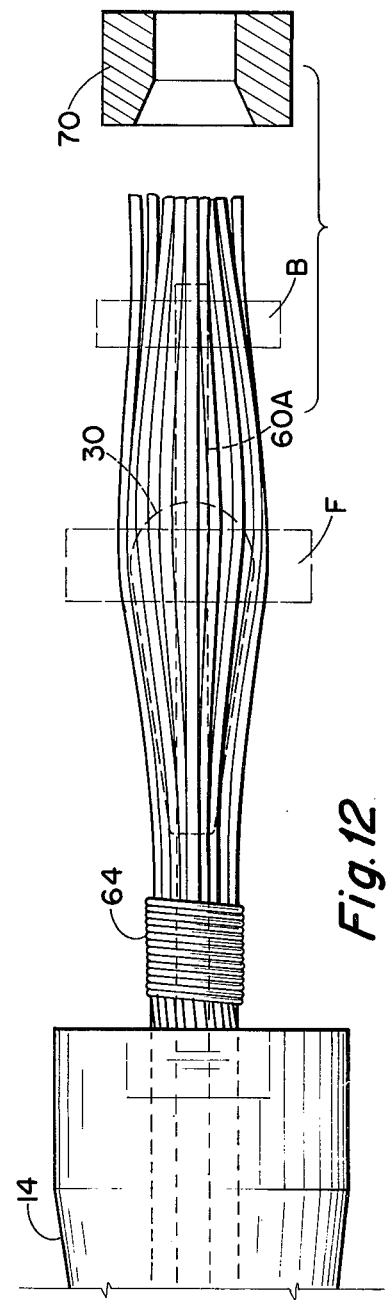

SOCKET FOR STRUCTURAL STRAND

SUMMARY OF THE INVENTION

It is an object of this invention to provide a mechanically connected socket and fitting for connection with the end of structural strand of the type having a center core of a plurality of strands surrounded by one or more layers of strand. Typically the socket and fitting connector of this invention is applicable to be used in the field on the job site where the length of strand can be accurately determined and is an improvement over prior art types of sockets utilizing spelter, i.e. molten zinc or other materials or swedged type sockets both of which require extensive shop equipment to facilitate the connection.

In its preferred embodiment the invention is directed to a socket for structural strand and a method of assembling the structural strands to the socket. The structural strand to which this invention is typically directed is of the type having a center core of seven strands surrounded by an inner layer of strands which inner layer is surrounded by an outer layer of strands. The socket of the invention includes a sleeve having an opening therethrough with the sleeve defined by a connector end and a strand receiving end. The opening, in sequence from the connector end to the strand end, includes a threaded portion followed by a constant diameter cylindrical portion followed by an inwardly tapered portion to the opening at the strand end.

A special wedge is positionable within the sleeve, with the wedge comprising a tapered body portion substantially following the inwardly tapered portion of the sleeve. Toward the connector end of the wedge is a spherical shaped or bulbous head. An axial opening exists through the wedge to receive the center core when assembled. A plurality of serrations such as sharp V-shaped end teeth or threads exist circumferentially on the inside of the axial opening. The outer ends of the teeth being substantially the same as the inside diameter of the axial opening. A plurality of serrations such as sharp end saw teeth are positioned around a portion of the exterior of the tapered body of the wedge behind the bulbous head. The ends of the sharp saw teeth extend slightly above a line representing the extended surface of the tapered body. In one embodiment, the angular portion of the saw teeth can be directed toward the bulbous end. The bulbous or spherical head includes a plurality of circumferential grooves about a major portion of the circumference of the head, each groove is designed to receive longitudinally either an inner or an outer strand when assembled. To assist in gripping the strands a first slot exists across the wedge through its axis and extends from the bulbous head to a stress relief opening in the tapered body portion. A second slot extends across the wedge and through its axis but is transverse to said first slot and extends from the tapered end to a stress relief opening in the bulbous body. Thus, the wedge is defined as a unitary member having quadrants formed by the first and second slots where they are adaptable, in the assembly to tightly grip the strands as a static load condition. Increase dynamic load on the strand tends to cause the gripping action of wedge to increase the grip on the inner core and inner and outer strand layers. A cylindrical push ring is positionable in the cylindrical portion of the sleeve. The push ring has a flat surface toward the connector end and an interior beveled end toward the strand end, which when assembly is positioned against the inner and outer strands that surround the bulbous head.

A washer or ring with bendable lock tabs is positioned at the connector end of the sleeve for maintaining the parts in their assembled condition. A connector, or adaptor or fitting, having means to attach to other types of fittings, has a central opening to receive the working end of the structural strand which includes its core and the inner and outer layers. An exterior threaded surface on the connector is provided for rotatable connection with the thread means in the sleeve opening. At the end of the threaded surface is a larger diameter shoulder for abutment with the lock ring and hence the connector end of the sleeve.

BRIEF DESCRIPTION OF THE DRAWINGS

FIG. 7 is an enlarged detail of the threads, grooves and saw teeth used as a part of the wedge.

FIGS. 8-14 describe the strand and sequence of installation of the structural strand to the connector of this invention.

DETAILED DESCRIPTION OF THE PREFERRED EMBODIMENT

Before explaining the present invention in detail, it is to be understood that the invention is not limited in its application to the details of the construction and arrangement of parts illustrated in the accompany drawings. The invention is capable of other embodiments and of being practiced or carried out in a variety of ways. It is to be understood that the phraseology and terminology employed herein is for the purpose of description and not of limitation.

Figure 1:
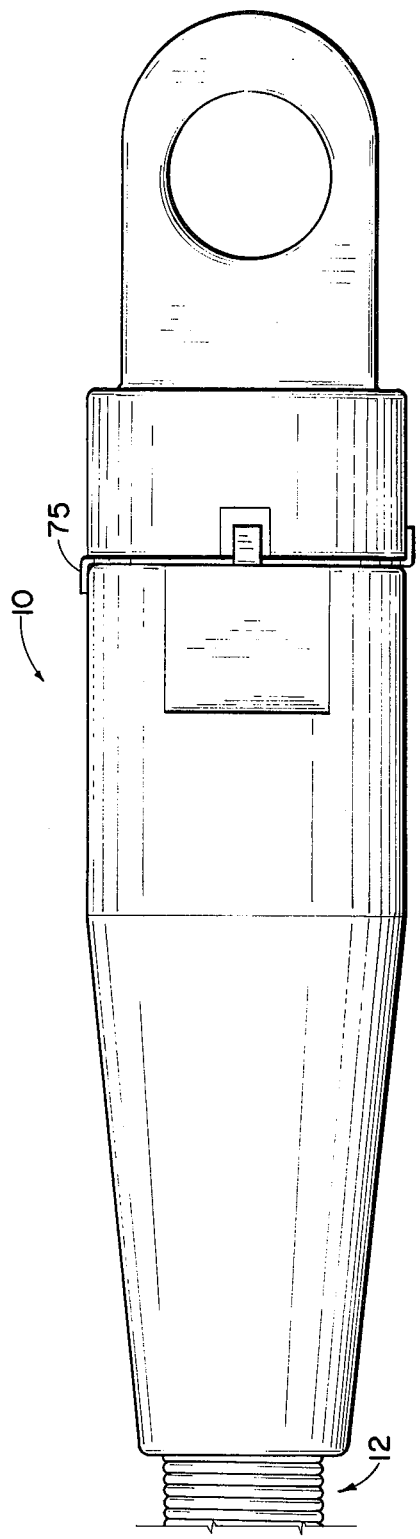
FIG. 1 is a elevational side view of the connector of this invention as assembled.

Referring now to FIG. 1, the connector of this invention is shown in elevation and generally designated by the numeral 10, as connected to a strand 12. The strand of this invention particularly described is that designated in the trade as 1×37, structural strand, the cross-section of which is best shown in FIG. 8b. It is to be understood that the invention is adaptable to other forms of structural strand. Such strand is useful as guy wire to support other structures, such as radio towers, electrical transmission towers, etc.

Figure 2:
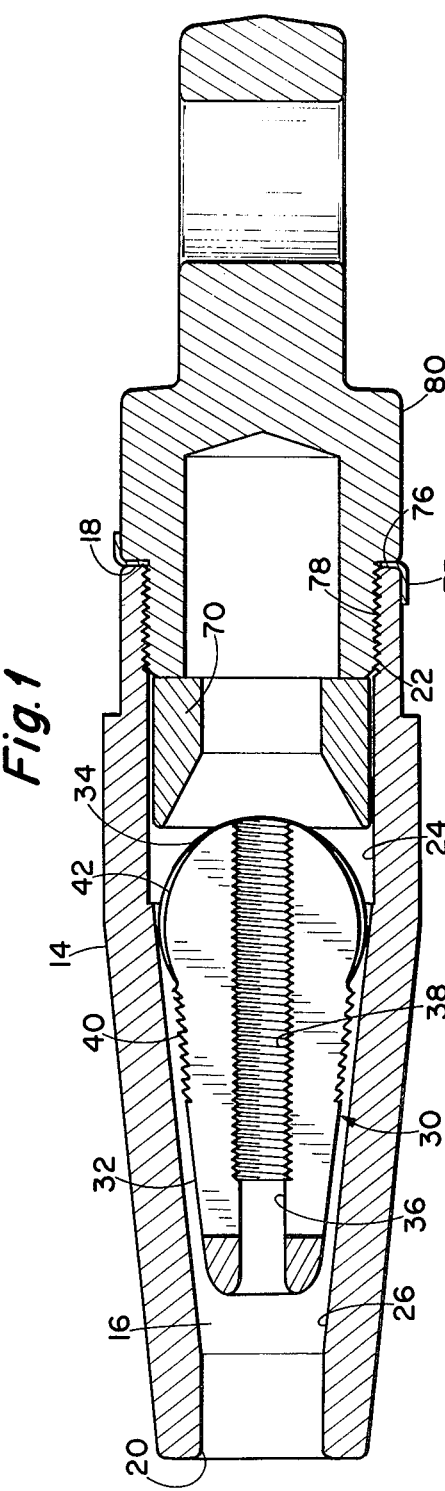
FIG. 2 is a cross sectional view of the connector and its components without the stranded wire.
Figure 6:
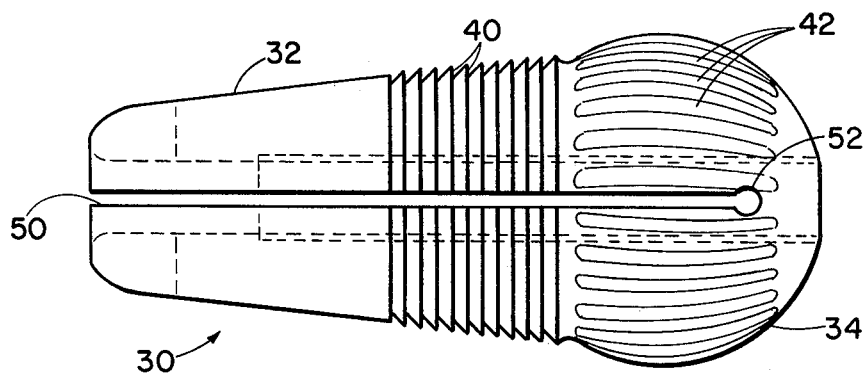
FIG. 6 is an elevational view of the wedge taken 90° from the position shown in FIG. 3.
Figure 3:
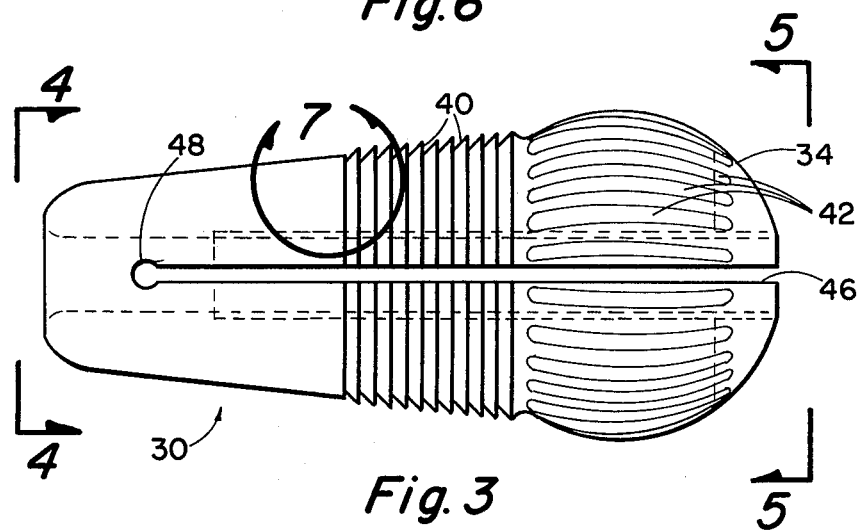
FIG. 3 is a side view of the wedge used in this invention.
Figures 4, 5:
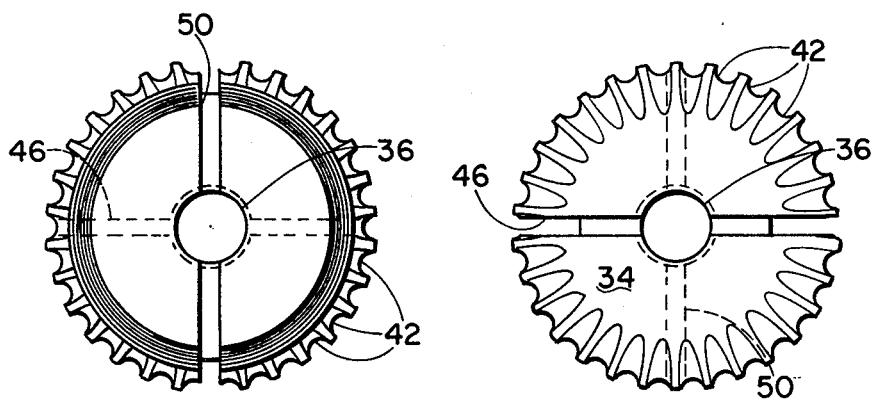
FIG. 4 is a left end view of the wedge of FIG. 3.
FIG. 5 is a right end view of the wedge of FIG. 3.

FIG. 2 is a cross-section of the connector without the strand assembled. The assembly includes a sleeve 14 having an opening 16, coaxially therethrough. The sleeve 14 being defined herein by a connector end 18 and a strand end 20. The sleeve 14 may be exteriorly tapered as shown. At the connector end, interior threads 22 are provided for a short distance followed by a constant diameter cylindrical portion 24, followed by an inwardly tapered portion 26 to the strand end 20. Interiorly of the sleeve and used as a part of the assembly is a wedge generally designated by the numeral 30.

The wedge comprises a tapered body portion 32 and a bulbous head 34 toward the connector end when inside of the sleeve 14. An axial opening 36 extends through the wedge to receive the center core of the strand, when assembled. A plurality of sharp V-shaped teeth or threads 38 extend for a portion of the inside of opening 36, the ends of the teeth of substantially the same inside diameter of the opening 36. On the exterior of the taper 32 and behind the bulbous portion 34 are a plurality of sharp saw teeth shaped grooves or threads 40, the angular portion of the teeth being directed toward the bulbous portion 34. The saw teeth ends extends slightly beyond an imaginary extended surface of the tapered portion. The sharp teeth 38 and the saw teeth 40 being adapted during the assembly to provide gripping surfaces into the various portions of the strand 12. The bulbous head includes a plurality of circumferential grooves 42 about a major portion of the outer part of the bulbous member. Each groove is of a radius designed to receive an inner or an outer strand when assembled. A unique feature of the invention is a first slot 46 across the wedge, through its axis and extending from the bulbous head to a stress relief opening 48 located in the tapered body of the wedge. (FIGS. 3-6). A second slot 50 extends across the wedge and through its axis transverse to the first slot from the tapered end to a stress relief opening 52 in the bulbous end. A connector 80 includes a smaller diameter portion 78 for connection with interior threads 22 of the sleeve 14 terminating at a larger diameter shoulder 76.

The assembly of the connector of this invention to the end of a strand is best shown by references to FIGS. 8-14. Referring to FIG. 8A, a piece of 1×37 structural strand 12 is cut to length creating end 60, after a first seizing 62 and a second seizing 64 has been applied to the strands to keep the wound strands from unraveling.

Figure 13:
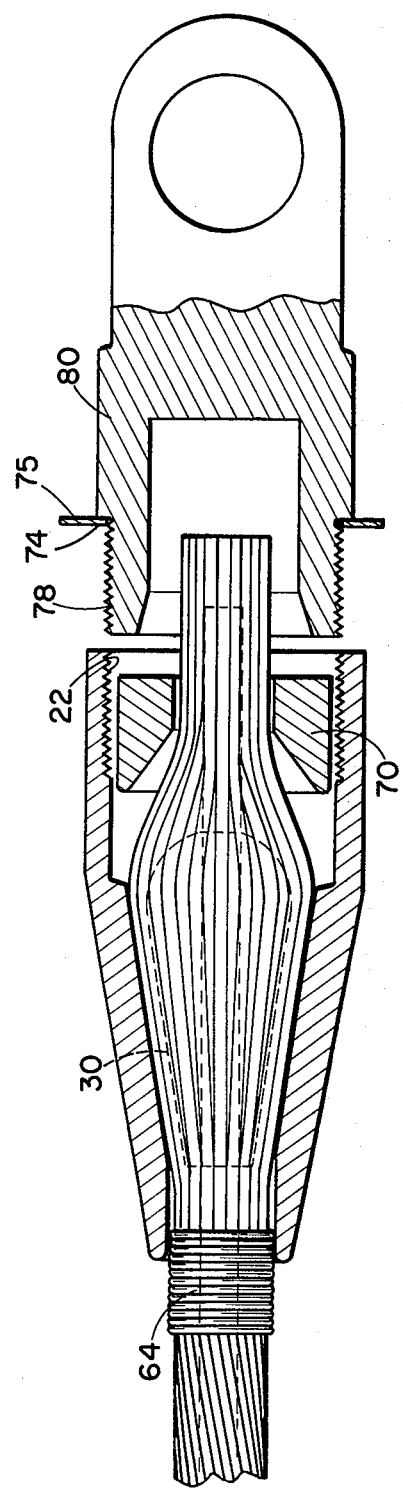

As shown in FIG. 8B the strand comprises a basic center core 60A formed of seven wound strands, i.e. a center strand and six outer strands. The core is surrounded by an inside layer 60B of wound strands which is further surrounded by an outside layer 60C of wound strands. As shown in FIG. 9, strand 12 and its end 60 is inserted through the strand end 20 of sleeve 14 to a position substantially as shown. The first seizing 62 is removed allowing the inside and outside layer of wound strands to 'broom' out. The center core 60A is then cut back as needed to a given length. As shown in FIG. 10 the next procedure is to slip wedge 30 over the center core 60A. That is, the center core will pass through opening 36 and the wedge is driven as far toward the seizing 64 as possible. The outside layer of strands 60C are bent outwardly while the inside layer is clamped at B, using for example a common hose clamp. This is shown in FIG. 11, showing the clamp B having the inside layer of wires 60B. Each inside layer of wire is placed within alternate grooves 42 of the bulbous head 34 of the wedge. The outer layer wires are placed in the remaining grooves between the inside layer wires, and thence inside the clamp B. As shown in FIG. 12, a second clamp is placed at F around the assembly of wires closer to the bulbous member while the remaining free end of wires are compressed. The next procedure involves sliding ring 70 over the free end of the wires. Clamp B is removed and the ring will then be forced as far toward the wedge as possible, after which the clamp F is removed. As shown in FIG. 13, the strand and wedge assembly is thence pulled into the socket 12 as far as possible and the ring 70 driven in as far as possible.

Figure 14:
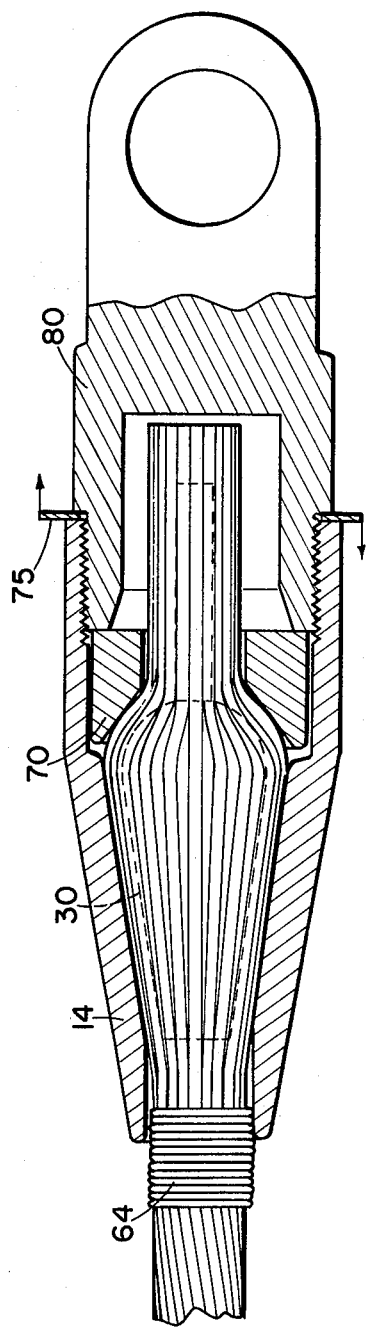

A lock ring 74 is positioned about a shoulder 76 of the fitting adapter 80. Threads 78 are then connected with threads 22 and with the adapter or connector being rotated until the lock ring has shouldered on the connector end 18 which will be the final assembled position as shown in FIG. 14, thereafter the lock ring ears 75 will be bent accordingly upon flat portions found on the sleeve 14 and the connector 80.

Figure 15:
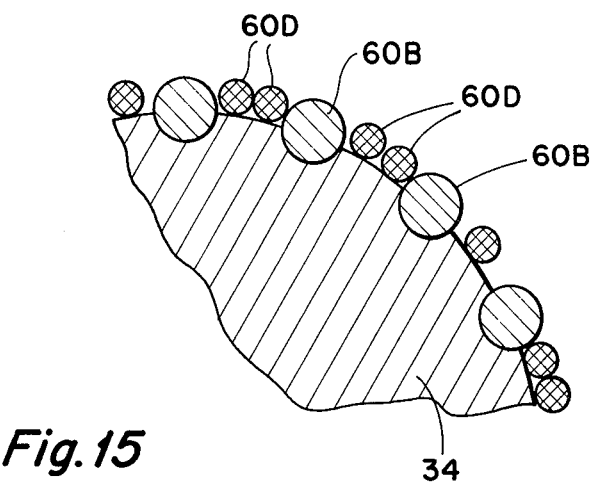
FIG. 15 is a partial sectional view describing the nesting of strand on the bulbous head when the outer strands are of different diameter.

Some structural strands have inner and/or outer layers of different diameter wires. FIG. 15 depicts a nesting arrangement of such wires or strands 60B and 60D about the bulbous head of the wedge. It is preferred in all embodiments herein that the outer edge of each of the strands are substantially of the same outer diameter.

What is claimed is:

1. A socket for structural strand of the type having a center core of seven strands surrounded by an inner layer of strands and an outer layer of strands comprising:
   (a) a sleeve having an opening therethrough defining a connector end and a strand receiving end, said opening including, in sequence, a threaded portion at said connector end, a constant diameter cylindrical portion, and an inwardly tapered portion to said strand end;
   (b) a wedge for positioning in said sleeve, said wedge comprising a tapered body and a bulbous head, an axial opening through said wedge to receive said center core when assembed, a plurality of V-shaped circumferential teeth around the interior periphery of said opening, the outer ends of the teeth no lesser than the diameter of said axial opening, a plurality of saw teeth around a portion of the exterior of the tapered body of said wedge behind said bulbous head, the ends of said saw teeth extending slightly above an imaginary continuation of said tapered body, said bulbous head including a plurality of grooves about a major portion of its circumference, each groove to receive one of said inner and outer strands when assembled, a first slot across the wedge through its axis extending from the bulbous head to a stress relief opening in said tapered body and a second slot across the wedge and through its axis transverse to said first slot extending from said tapered end to a stress relief opening in said bulbous body;
   (c) a push ring positionable in said cylindrical portion of said sleeve, said ring having, when assembled, a flat surface toward said connector end and an interior beveled end toward the strand end positionable against the inner and outer strands;
   (d) a lock ring positionable at said connector end of said sleeve; and
   (e) a connector, said connector having a central opening to receive the end of said structural strand, a threaded surface for rotatable connection with said thread means and a shoulder for abutment with said lock ring.

2. A socket for structural strand of the type having a center core surrounded by at least one outer layer of strand elements comprising:
   (a) a sleeve having an opening therethrough defining a connector end and a strand receiving end, said opening including, in sequence, a threaded portion at said connector end, a constant diameter cylindrical portion, and an inwardly tapered portion to said strand end;

(b) a wedge for positioning in said sleeve, said wedge comprising a tapered body and a bulbous head, an axial opening through said wedge to receive said center core when assembed, a plurality of V-shaped circumferential teeth around the interior periphery of said opening, the outer ends of the teeth no lesser than the diameter of said axial opening, a plurality of saw teeth around a portion of the exterior of the tapered body of said wedge behind said bulbous head, the ends of said saw teeth extending slightly above an imaginary continuation of said tapered body, said bulbous head including a plurality of grooves about a major portion of its circumference, each groove to receive a strand element from said outer layer when assembled, a first slot across the wedge through its axis extending from the bulbous head to a stress relief opening in said tapered body and a second slot across the wedge and through its axis transverse to said first slot extending from said tapered end to a stress relief opening in said bulbous body;

(c) a push ring positionable in said cylindrical portion of said sleeve, said ring having, when assembled, a flat surface toward said connector end and an interior beveled end toward the strand end positionable against the said strand elements in said outer layers; and (d) a connector, said connector having a threaded surface for rotatable connection with said threaded portion on said sleeve, and having a stop shoulder for abutment with said connector end of said sleeve.

3. A socket for structural strand of the type having a center core surrounded by at least one outer layer of wound strand elements comprising:

(a) a sleeve having an opening therethrough defining a threaded connector end and a strand end with an interior inwardly tapered portion to said strand end;

(b) a wedge for positioning in said sleeve, said wedge comprising a tapered body and a bulbous head, an axial opening through said wedge to receive said center core when assembled, a serated surface around at least a portion of the interior periphery of said axial opening, a serated surface around at least a portion of the exterior of the tapered body, a plurality of grooves about a portion of the circumferential of said bulbous head, each groove to receive a strand element of said outer layer when assembled, a slot extending longitudinally across said wedge through its axis from one end of the wedge to a stress relief opening;

(c) connector means rotatably attached to said sleeve to force said wedge into said tapered body and retain said outer layer strand element about said bulbous head.

4. A method for attaching a connector to structural strand of the type having a center core surrounded by an outer layer of strand elements and wherein said connector comprises:

(a) a sleeve having an opening therethrough defining a connector end and a strand receiving end, said opening including, in sequence, a threaded portion at said connector end, a constant diameter cylindrical portion, and an inwardly tapered portion to said strand end;

(b) a wedge for positioning in said sleeve, said wedge comprising a tapered body and a bulbous head, an axial opening through said wedge to receive said center core when assembed, a plurality of V-shaped circumferential teeth around the interior periphery of said opening, the outer ends of the teeth no lesser than the diameter of said axial opening, a plurality of saw teeth around a portion of the exterior of the tapered body of said wedge behind said bulbous head, the ends of said saw teeth extending slightly above an imaginary continuation of said tapered body, said bulbous head including a plurality of grooves about a major portion of its circumference, each groove to receive a strand element from said outer layer when assembled, a first slot across the wedge through its axis extending from the bulbous head to a stress relief opening in said tapered body and a second slot across the wedge and through its axis transverse to said first slot extending from said tapered end to a stress relief opening in said bulbous body;

(c) a push ring positionable in said cylindrical portion of said sleeve, said ring having, when assembled, a flat surface toward said connector end and an interior beveled end toward the strand end positionable against the said strand elements in said outer layers; and (d) a connector, said connector having a threaded surface for rotatable connection with said threaded portion on said sleeve, and having a stop shoulder for abutment with said connector end of said sleeve;

the method comprising the steps of:
(1) inserting the working end of the structural strand into and through the opening in said sleeve;
(2) inserting the center core into the axial opening and drawing same toward a given point along the running end of said structural strand;
(3) positioning each outer layer strand elements into a groove of said bulbous head;
(4) positioning said push ring about the outer layer of strand elements adjacent said bulbous head;
(5) drawing the assembled wedge, structural strand and push ring into said sleeve;
(6) threadable attaching said connector until it seats against said connector end to thereby move said push ring toward said wedge; and
(7) locking said connector to said sleeve.

5. A socket for structural strand of the type having a center core surrounded by at least one outer layer of wound strand elements comprising:

(a) a sleeve having an opening therethrough defining a connector end and a strand end with an interior inwardly tapered portion to said strand end;

(b) a wedge for positioning in said sleeve, said wedge comprising a tapered body and a bulbous head, an axial opening through said wedge to receive said center core when assembled, a serated surface around at least a portion of the interior periphery of said axial opening, a plurality of longitudinal arcuate grooves about said bulbous head, each groove to receive a strand element of said outer layer when assembled, at least one slot means extending longitudinally across said wedge through its axis from one end of the wedge;

(c) connector means attachable to said sleeve connector end to force said wedge and assembled strand into said tapered body.

* * * * *